United States Patent
Beckman

(10) Patent No.: US 11,391,862 B2
(45) Date of Patent: Jul. 19, 2022

(54) SYSTEM AND METHOD FOR DETECTING THE PRESENCE OF AN OBJECT

(71) Applicant: THE BOEING COMPANY, Chicago, IL (US)

(72) Inventor: John Christiaan Beckman, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/819,309

(22) Filed: Mar. 16, 2020

(65) Prior Publication Data

US 2021/0286101 A1    Sep. 16, 2021

(51) Int. Cl.
*G01V 8/14* (2006.01)
(52) U.S. Cl.
CPC ..................... *G01V 8/14* (2013.01)
(58) Field of Classification Search
CPC ............... G01B 2210/00; G01B 1/00
See application file for complete search history.

(56) References Cited

U.S. PATENT DOCUMENTS 3,693,025 A * 9/1972 Brunton ............. G01N 21/8422
                                                   250/340
4,260,187 A * 4/1981 Frosch ................... B64G 1/646
                                                   294/86.4
5,339,198 A     8/1994 Wheatly et al.

OTHER PUBLICATIONS

*Hot Mirrors and Cold Mirrors (IR Control Filters)—JNS Glass & Coatings* [online] [retrieved Jan. 28, 2020], retrieved from the internet <https://jnsglass.com/hot-mirrors-cold-mirrors/> (6 pages).
*NIR Absorbing Coatings Products: Spectre™ | Epolin* [online] [retrieved Jan. 28, 2020], retrieved from the internet <https://www.epolin.com/nir-absorbing-coatings> (2 pages).
*Spectre™ 330 | Green IR Absorbing Coatings & Screen Ink | Epolin* [online] [retrieved May 6, 2020], retrieved from the internet <https://www.epolin.com/product/Spectre330> (3 pages).

* cited by examiner

*Primary Examiner* — Tony Ko
(74) *Attorney, Agent, or Firm* — Alston & Bird LLP

(57) ABSTRACT

A system, method and mirror are provided in order to more reliably detect the presence of an object, such as a person. In the context of a system, the system includes a sensor configured to emit signals having a predefined wavelength and to detect a reflection of the signals having the predefined wavelength. The system also includes a reflective panel positioned relative to the sensor such that the signals emitted by the sensor are directed toward the reflected panel. The system further includes a filter associated with the reflective panel and positioned relative to the sensor such that the signals emitted by the sensor are also directed toward the filter. The filter is configured to attenuate at least signals having the predefined wavelength.

20 Claims, 5 Drawing Sheets

SYSTEM AND METHOD FOR DETECTING THE PRESENCE OF AN OBJECT

TECHNOLOGICAL FIELD

An example embodiment relates generally to a system and method of reliably detecting the presence of an object and, more particularly, to a system, a method and an associated mirror that utilizes a filter associated with a reflective panel in order to attenuate at least some of the signals that are otherwise utilized to detect the presence of an object, such as in an instance in which the signals are incident upon the mirror due to the absence of an object, in order to avoid misinterpretation of signals reflected from a mirror as being indicative of the presence of an object.

BACKGROUND

Sensors, such as infrared (IR) sensors, are utilized to detect the presence of an object, such as a person. For example, IR sensors may be utilized in conjunction with sinks and toilets in order to detect the presence of a person in proximity thereto. In an instance in which a sensor associated with a sink detects the presence of a person, such as a person holding his or her hands under the faucet of the sink, the sensor may provide an output signal that causes the faucet to be activated and to dispense water, such as for a predefined period of time while the person who has been detected washes their hands. As another example, a sensor associated with a toilet may be configured to provide an output signal that causes the toilet to flush in an instance in which a person whose presence was previously detected in proximity to the toilet is no longer detected to be proximate the toilet.

Sensors are generally configured to detect the presence of an object, such as a person, based upon the detection of signals that were originally emitted by the sensor and were then reflected or scattered by an object, such as a person, in the vicinity of the sensor. The sensor may be configured to detect a person within a predefined range of the sensor with different ranges associated with different applications. With respect to the sensor associated with a sink, for example, the predefined range may be relatively small such that the presence of the person will be detected in an instance in which the person places her hands under the faucet, but not in an instance in which the person is merely standing in front of the sink with their hands at their side.

By associating sensors that are configured to detect the presence of an object, such as a person, with sinks and toilets, the sinks and toilets are more frequently capable of hands-free operation. As the hands-free operation of sinks and toilets may increase the convenience with which sinks and toilets are utilized and may also decrease the transmission of germs that might otherwise occur by touching the knobs, handles or levers associated with the sinks and toilets, sensors are increasingly being associated with sinks and toilets.

With the increasing use of sensors in conjunction with sinks and toilets, sensors may sometimes be utilized in environments, such as relatively small lavatories, in which a mirror is positioned across from the sink or toilet. In these environments and in an instance in which there is no object, such as no person, standing between sensor and the mirror, the signals emitted by the sensor impinge upon the mirror and are reflected in such a manner as to be captured by the sensor, such as a detector of the sensor. Based upon the detection of the reflected signals, the sensor may incorrectly identify the presence of an object, such as a person, since the detection of reflected signals is also indicative of the presence of the object. As such, the sensor may generate an output signal that triggers the same operation that would be triggered in an instance in which the presence of an object, such as a person, is detected, such as by turning on the water even though there is no person positioned proximate the sink.

In these situations, the mirror may sometimes be moved, repositioned, or angled relative to the sensor so as to no longer reflect the signals emitted by the sensor in such a manner as to be captured by the sensor. Thus, this relocation of the mirror may avoid the false identification of the presence of an object, such as a person. However, certain environments, such as the lavatories onboard an aircraft, a cruise ship, a train, or the like, may have only limited locations in which a mirror may be placed and it may therefore not be feasible to reposition the mirror to the extent necessary to avoid the reflectance of signals to the sensor and the corresponding potential of incorrectly identifying the presence of an object, such as a person.

BRIEF SUMMARY

A system and method are provided in accordance with an example embodiment in order to more reliably detect the presence of an object, such as a person. In this regard, the system and method of an example embodiment attenuates at least some of the signals emitted by a sensor that otherwise would have been reflected from a reflective panel, such as a mirror, and returned to the sensor, thereby reducing the likelihood that the sensor will incorrectly detect the presence of an object, such as a person. Thus, by associating a filter that provides for the attenuation of at least some of the signals with a reflective panel, such a mirror, the reflective panel may be positioned in alignment with the sensor, such as on an opposite wall from the sensor, without causing the sensor to falsely detect the presence of an object. Consequently, the system and method of an example embodiment facilitate the co-location of a sensor and a reflective panel, such as a mirror, in an environment that requires the sensor and the reflective panel to be disposed in an aligned facing relationship, such as on the opposed sidewalls of a lavatory.

In an example embodiment, a system is provided for detecting the presence of an object. The system includes a sensor configured to emit signals having a predefined wavelength and to detect a reflection of the signals having the predefined wavelength. The system also includes a reflective panel positioned relative to the sensor such that the signals emitted by the sensor are directed toward the reflected panel. The system further includes a filter associated with the reflective panel and positioned relative to the sensor such that the signals emitted by the sensor are also directed toward the filter. The filter is configured to attenuate at least signals having the predefined wavelength.

The reflective panel of an example embodiment comprises a mirror including an at least partially transparent layer and a reflecting layer positioned as a backing to the at least partially transparent layer. The filter of one example embodiment is disposed on a surface of the at least partially transparent layer that faces away from the reflecting layer and toward the sensor. Alternatively, the filter of another example embodiment is disposed between the at least partially transparent layer and the reflecting layer. In an example embodiment, the filter is disposed on only a portion of the reflective panel such that other portions of the reflective panel are free of the filter. In this example embodiment, the portion of the reflective panel on which the filter is disposed includes the portion of the reflective panel toward which the signals emitted by the sensor are directed. The filter of an example embodiment includes a bandpass filter that is also configured to allow visible light to pass thereto with less attenuation than that experienced by the signals having the predefined wavelength. In this example embodiment, the predefined wavelength may include an infrared (IR) or near infrared (NIR) wavelength such that the filter is configured to attenuate at least IR or NIR signals. The filter of an example embodiment includes ink that is configured to attenuate at least signals having a predefined wavelength.

The sensor of an example embodiment is also configured to provide an output that at least partially controls operations of a sink in response to detection of the reflection of signals having a predefined wavelength. In this example embodiment, the sensor is positioned proximate the sink and the reflective panel, as well as the filter associated with the reflective panel, are positioned on a surface opposite the sink. In another example embodiment, the sensor is configured to provide an output that at least partially controls operation of a toilet in response to detection of the reflection of signals having the predefined wavelength. In this example embodiment, the sensor is positioned proximate the toilet and the reflective panel, as well as the filter associated with the reflective panel, are positioned on a surface opposite the toilet.

In another example embodiment, a method is provided for detecting the presence of an object, such as a person. The method includes emitting signals having a predefined wavelength and being directed toward a reflective panel. In the absence of the object being disposed between a source of the signals and the reflective panel, the method includes at least partially attenuating the signals having the predefined wavelength with a filter that is associated with the reflective panel and is positioned such that the signals that are emitted are also directed toward the filter. The method further includes detecting a reflection of the signals having the predefined wavelength in response to the presence of the object between the source of the signals and the reflective panel.

The method of an example embodiment also includes allowing visible light to pass through the filter with less attenuation than that experienced by the signals having the predefined wavelength. In this example embodiment, the predefined wavelength may include an infrared (IR) or near infrared (NIR) wavelength. As such, the method of this example embodiment at least partially attenuates the signals by at least partially attenuating IR or NIR signals. In an example embodiment, the method also includes operating a sink or a toilet in response to detection of the reflection of the signals having the predefined wavelength.

In a further example embodiment, a mirror is provided that includes an at least partially transparent layer and a reflecting layer positioned as a backing to the at least partially transparent layer. The mirror also includes a bandpass filter disposed to overlie only a portion of the reflecting layer such that signals incident upon other portions of reflecting layer do not pass through the bandpass filter. The bandpass filter is configured to attenuate at least signals having a predefined wavelength, but to allow visible light to pass therethrough with less attenuation than that experience by the signal having the predefined wavelength.

The bandpass filter of an example embodiment is disposed on a surface of the at least partially transparent layer that faces away from the reflecting layer. The bandpass filter of an alternative embodiment is positioned between the at least partially transparent layer and the reflecting layer. In an example embodiment, the predefined wavelength includes an infrared (IR) or near infrared (NIR) wavelength such that the bandpass filter is configured to attenuate at least IR or NIR signals. The bandpass filter of an example embodiment includes ink that is configured to attenuate at least signals having the predefined wavelength.

BRIEF DESCRIPTION OF THE FIGURES

Figure 1:
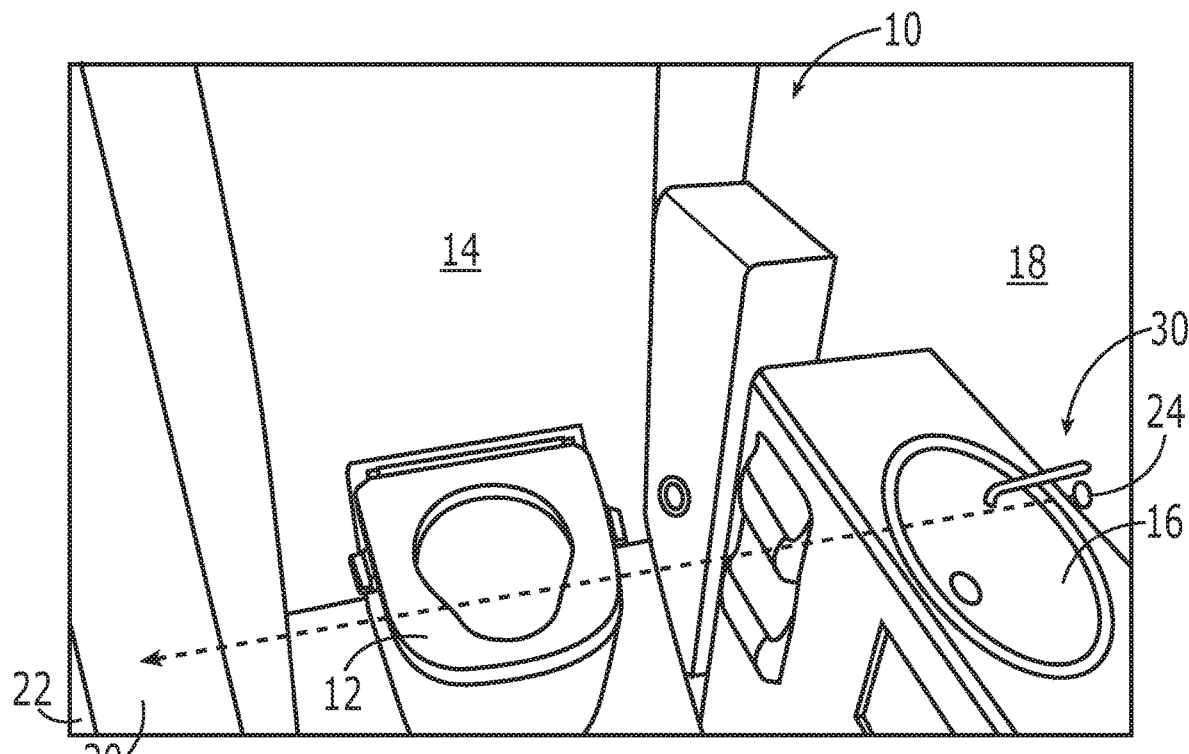
Figure 2:
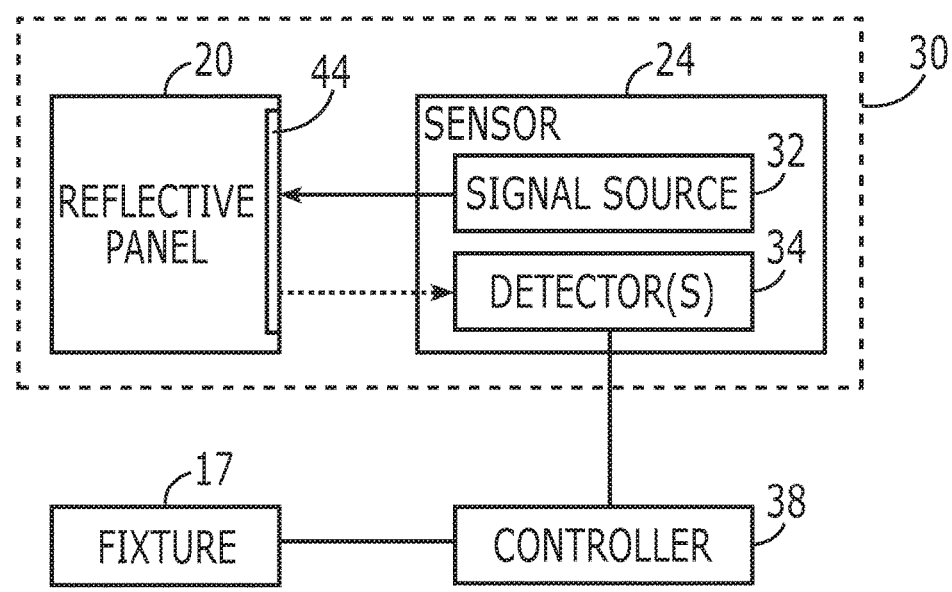
Figure 3:
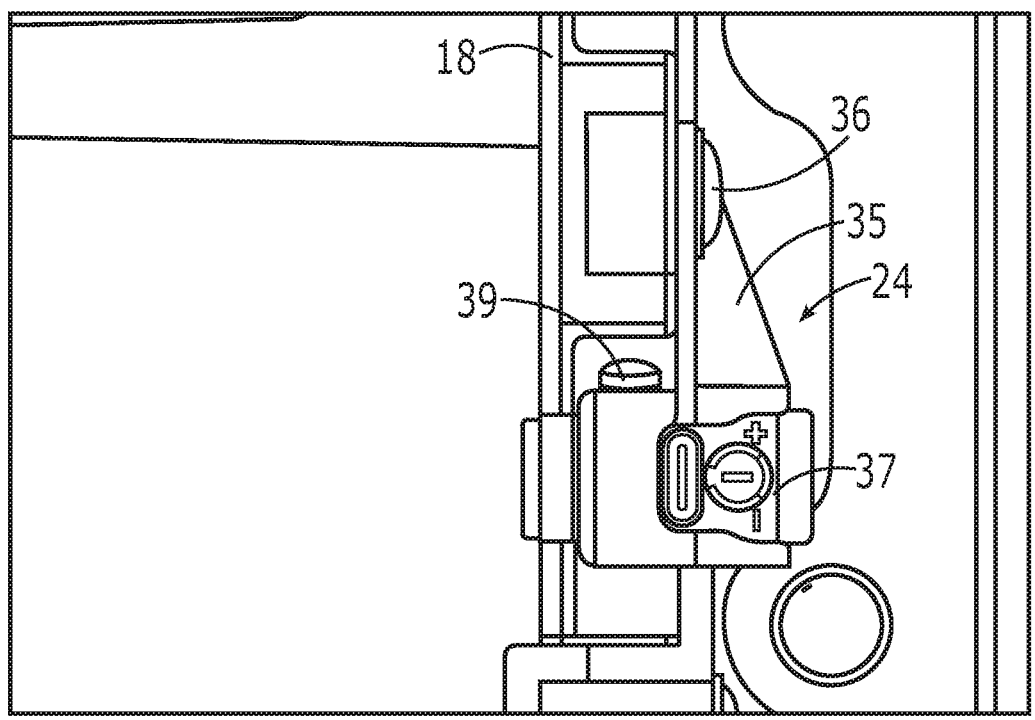
Figure 4:
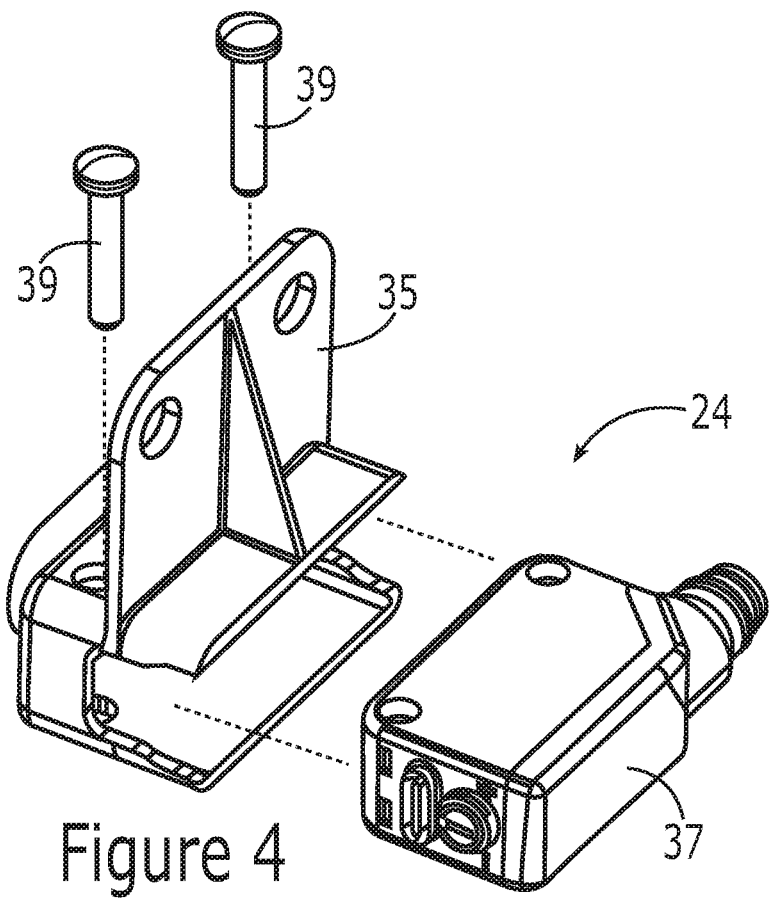
Figure 5A:
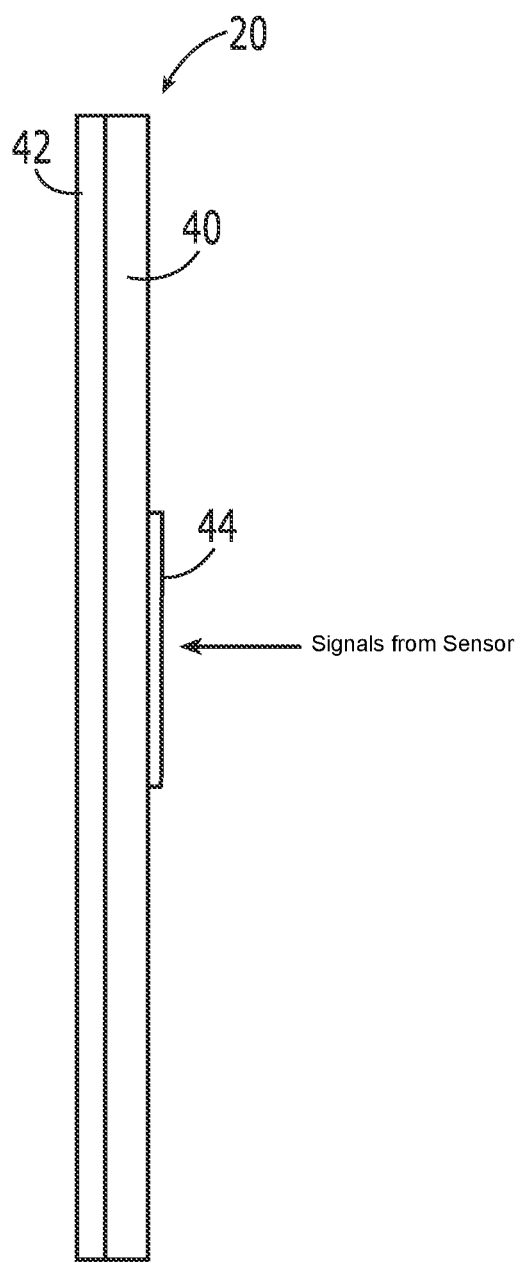
Figure 5B:
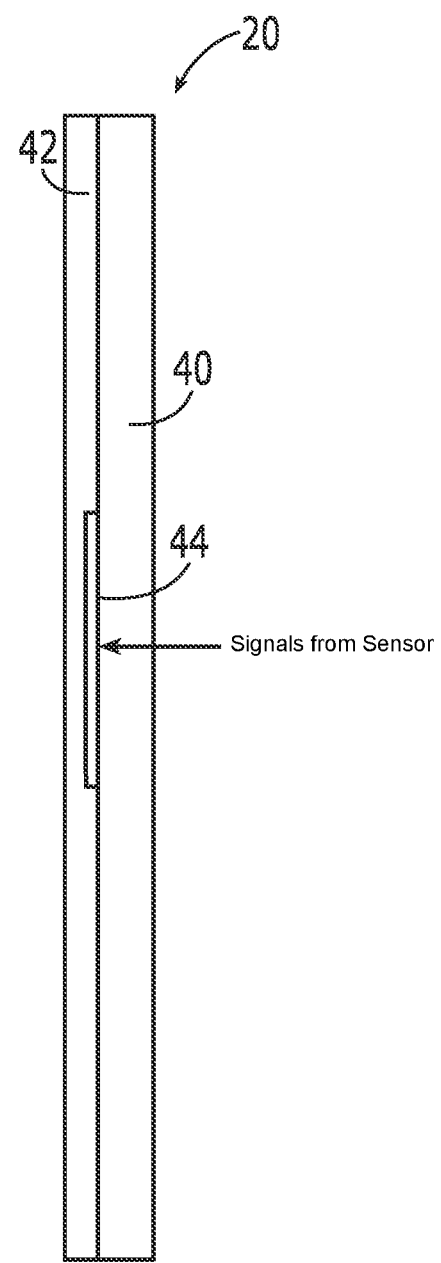
Figure 6:
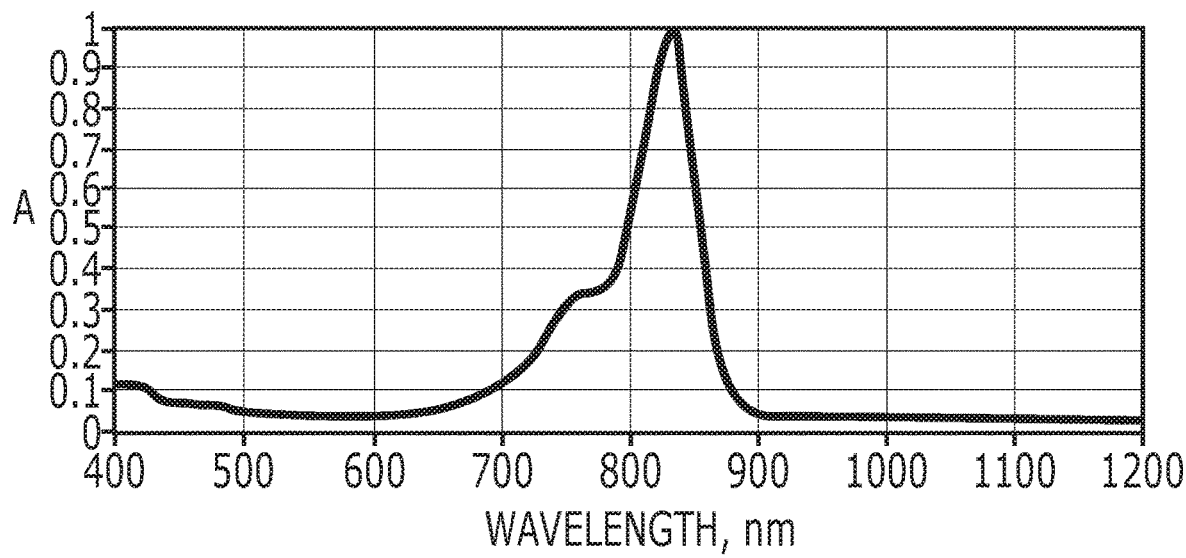
Figure 7:
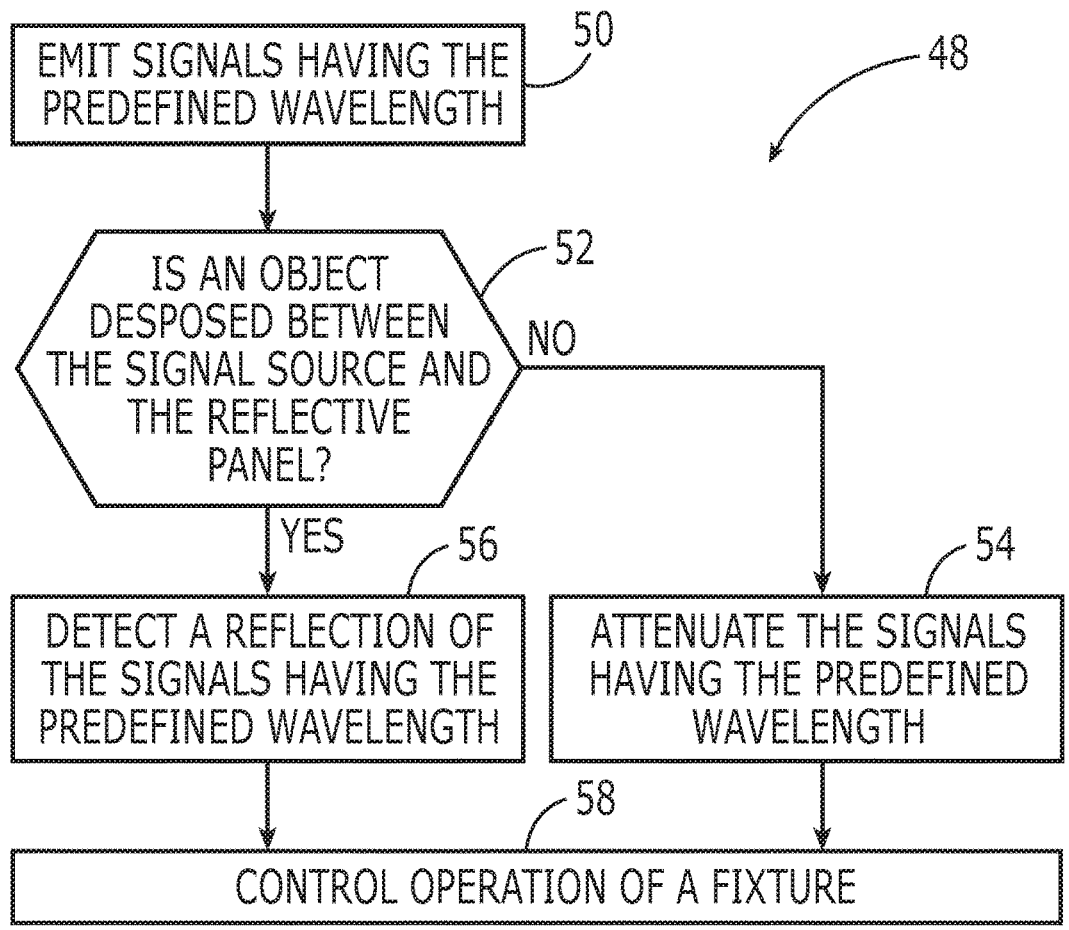
Figure 8:
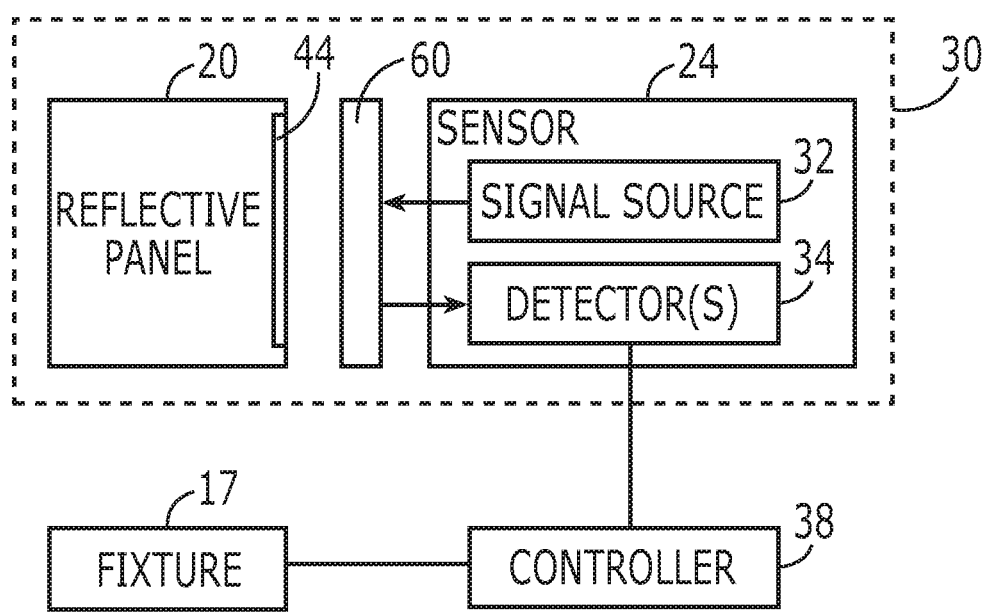

Having thus described certain example embodiments of the present disclosure in general terms, reference will hereinafter be made to the accompanying drawings, which are not necessarily drawn to scale, and wherein:

FIG. 1 is a perspective view of a portion of a lavatory having a mirror in accordance with an example embodiment positioned on an opposite wall from a sink and in alignment with a sensor associated with the sink;

FIG. 2 is a schematic block diagram of a system in accordance with an example embodiment;

FIG. 3 is a side view of a sensor positioned in a wall of the lavatory;

FIG. 4 is an exploded view of the sensor of FIG. 3;

FIG. 5A is cross-sectional view of a mirror in accordance with an example embodiment in which the filter is positioned on a surface of the at least partially transparent layer that faces away from the reflecting layer and toward the sensor;

FIG. 5B is a cross-sectional view of a mirror in accordance with an alternative embodiment in which the filter is between the at least partially transparent layer and the reflecting layer;

FIG. 6 is a graphical representation of the attenuation characteristics of a filter of a mirror in accordance with an example embodiment;

FIG. 7 is a flowchart illustrating operations performed, such as by the system of FIG. 2, in accordance with a method of an example embodiment; and FIG. 8 is a schematic block diagram of a system in accordance with an example embodiment in which an object is positioned between the sensor and the reflective panel.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A system and method are provided in accordance with an example embodiment in order to detect the presence of an object. As described herein, the system and method of some embodiments are configured to detect the presence of a person and, as such, may be deployed in conjunction with one or more fixtures, such as a sink or a toilet, in a lavatory. By detecting the presence of a person, a system and method of an example embodiment may control the associated fixture, such as to turn on or off the water in the sink or to flush the toilet.

The system and method of an example embodiment are configured to utilize a sensor to reliably detect the presence of an object, such as a person, without falsely identifying the presence of an object, such as a person, in an instance in which a reflective panel is positioned in alignment with the sensor, such as upon an opposite wall from the sensor. Thus, the system and method of this example embodiment may be configured to detect the presence of an object, such as a person, in an environment that is relatively confined and/or that has limited options for the placement of the sensor and a mirror, such as in the lavatories onboard an aircraft, a cruise ship, a train or the like. The system and method can also be used to provide additional design flexibility for lavatories in buildings where hands-free fixtures are to be used by allowing a mirror or other reflective surface to be positioned arbitrarily with respect to the hands-free fixtures.

However, the system and method may additionally or alternatively be configured to detect the presence of an object in other applications, including objects other than a person. For example, the system and method of an example embodiment may be configured to detect the presence of an object in a manufacturing or inspection environment in which a sensor may be aligned with a reflective surface, such as a metallic part, in at least some stages of the manufacturing process. Thus, while the system and method of an example embodiment will be generally described hereinafter in conjunction with the detection of the presence of a person in a lavatory, such as the detection of a person proximate a sink or toilet, this application of the system and method is described by way of example but not of limitation since the system and method may be configured to detect the presence of a variety of different objects in a number of other applications.

Referring now to FIG. 1, a perspective view of a lavatory 10 is illustrated in which the system and method of an example embodiment may be deployed. The illustrated lavatory 10 is provided by way of example as the lavatory may be differently configured in other embodiments. The lavatory 10 of the illustrated embodiment includes a toilet 12 proximate a rear wall 14, such as the wall opposite the doorway from which the lavatory of FIG. 1 is viewed. The lavatory 10 also includes a sink 16 positioned on one side wall 18 and a reflective panel 20, such as a mirror, positioned on the other side wall 22, opposite the sink. The sink 16 and the reflective panel 20 are positioned such that the reflective panel faces the sink and is aligned with the sink.

In accordance with an example embodiment, the lavatory 10 also includes a sensor 24 associated with the sink 16, such as by being positioned proximate the sink, e.g., slightly above the sink, in order to detect the presence of an object, such as a person. An example object 60 is illustrated in FIG. 8. With continuing reference to FIG. 1, the sensor 24 is positioned in or on the same side wall 18 as the sink and is slightly above the sink. As described in more detail below, the sensor 24 is configured to detect the presence of a person near the sink 16 and, in one example embodiment, to detect the presence of a person's hands under the faucet of the sink, such as in an instance in which the person is preparing to wash their hands. Thus, the field of view of the sensor 24 extends outwardly from the side wall 18, such as a diverging field of view that extends outwardly across the lavatory 10 in a substantially perpendicular direction from the side wall.

In the absence of a system and method in accordance with an example embodiment, the sensor 24 may falsely identify the presence of an object, such as a person, in an instance in which no person is not standing in front of the sink 16. This false identification is attributable to the reflection of the signals emitted by the sensor 24 from the reflective panel 20 which, in turn, is occasioned by the alignment of the reflective panel with the sink 16 and, in turn, with the sensor positioned proximate the sink as well as the field of view of the sensor that extends outward across the lavatory 10. As a result of the false identification of the presence of an object, such as a person, that may occur in the absence of a system and method in accordance with an example embodiment, the sink 16 may be errantly caused to be actuated, thereby unnecessarily consuming water and reducing the efficiency of operation.

By incorporating the system and method of an example embodiment, however, the instances in which the presence of an object, such as a person, is falsely identified are reduced, if not eliminated, without having to reposition the reflective panel 20 relative to the sink 16. Thus, while the system and method of an example embodiment may be utilized in a variety of environments, the system and method of an example embodiment may facilitate the improved performance of a sensor 24 in relatively small lavatories 10 in which the reflective panel 20 may not feasibly be repositioned relative to the sink 16 due to a limited amount of available space.

As depicted in FIG. 1 and as also shown in the system block diagram of FIG. 2, the system 30 of an example embodiment includes the sensor 24, a reflective panel 20, and a filter 44 associated with the reflective panel. The sensor 24, in turn, includes a signal source 32 that is configured to emit signals having a predefined wavelength and a detector 34 that is configured to detect a reflection of the signals having the predefined wavelength. Although the signal source 32 may be configured to emit signals having any of a variety of different wavelengths, the signal source of an example embodiment is configured to emit signals having an infrared (IR) and/or near infrared (NIR) wavelength. As such, the sensor 24 of an example embodiment may be considered an IR sensor with the predefined wavelength being an IR and/or NIR wavelength.

In the example application of FIG. 1, the sensor 24 is positioned on or in a side wall 18 in the lavatory 10 and is proximate the sink 16, such as by being positioned slightly above the sink and being centered relative to the sink. Although the sensor 24 may be mounted on or in the wall 18, in various manners, a side view depicting the sensor mounted in the side wall above the sink 16 is shown in FIG. 3. In this example embodiment and as also shown in the exploded view of FIG. 4, the sensor 24 includes a bracket 35 that is mounted to the side wall 18, such as with one or more fasteners 36, e.g., screws or other mechanical fasteners. The sensor 24 of this example embodiment also includes a housing 37 that is secured to the bracket 35 by one or more fasteners 39, such as, pins, screws or other mechanical fasteners The housing 37 of the sensor 24 of this example embodiment includes the signal source 32 that is configured to emit signals having the predefined wavelength and the detector 34 that is configured to detect the reflection of the signals having the predefined wavelength. In the illustrated embodiment, the signal source 32 is configured to transmit the signals outward from the sensor 24, such as in a generally horizontal direction extending outward from the sink 16 as indicated by the outwardly extending arrow in FIG. 1, and the detector 34 is configured to receive signals incident upon the sensor, such as following reflection or scattering from a person proximate the sink 16.

Although the detector 34 may be confirmed in various manners, the detector of an example embodiment includes a plurality of detector elements, such as first and second detectors, spaced apart from one another in order to permit the location of the object from which the signals reflected to be determined, such as by the detector or a controller 38 as described below, utilizing triangulation. Although FIGS. 3 and 4 illustrate one example of a sensor 24 relative to a fixture, such as a sink 16, the sensor that is depicted and described herein is provided by way of example, but not of limitation, as any of a variety of sensors may be employed, and the sensor may be attached to the surrounding structure in different manners and in different relative locations.

As shown in FIG. 2, the system 30 of this example embodiment also includes a reflective panel 20, such as a mirror. In the example application of FIG. 1, the reflective panel 20 is positioned on the side wall 22 opposite the sink 16 such that signals emitted by the signal source 32 of the sensor 24 are reflected back to the detector 34 of the sensor in the absence of an object, such as a person, standing between the sensor and the reflective panel. The reflective panel 20, such as a mirror, includes an at least partially transparent layer 40 and a reflecting layer 42 positioned as a backing to the at least partial transparent layer. Although the at least partially transparent layer 40 may be formed of various materials including glass, the at least partially transparent layer of an example embodiment is a polycarbonate layer that forms the exterior surface of the reflective panel 20. Likewise, the reflecting layer 42 that is positioned as a backing to the at least partially transparent layer 40 may be formed of various materials. In an example embodiment, however, the reflecting layer 42 is formed from silver or aluminum that is sprayed or otherwise applied to the at least partially transparent layer 40.

In addition to the at least partially transparent layer 40 and the reflecting layer 42 positioned as a backing to the at least partially transparent layer, the reflective panel 20 of an example embodiment also includes a filter 44, such as a bandpass filter. The filter 44 is configured to attenuate at least signals having the predefined wavelength, such as IR and/or NIR signals, while allowing signals having different wavelengths, such as visible light, to pass therethrough with less attenuation than that experienced by signals having the predefined wavelength. For example, the filter 44 may be configured to pass visible light with only a minimal amount of, if any, attenuation. The filter 44 of an example embodiment is also disposed so as to overlay only a portion of the reflecting layer 42, but not other portions of the reflecting layer. Thus, signals incident upon the other portions of the reflecting layer 42 are not incident upon and do not pass through the filter 44. In this regard, the filter 44 of an example embodiment is disposed so as to overlay that portion of the reflecting layer 42 upon which the signals emitted by the sensor 24 are incident in the absence of an object, such as a person, positioned between the sensor and the reflective panel 20. In this example embodiment, the filter 44 does not overlie other portions of the reflecting layer 42 upon which signals emitted by the sensor 24 are not incident.

FIG. 5A illustrates a reflective panel 20, such as a mirror, in accordance with one example embodiment. The reflective panel 20 of this example embodiment includes an at least partially transparent layer 40 and a reflecting layer 42 positioned as a backing to the at least partially transparent layer. The reflective panel 20 of this example embodiment also includes a filter 44, such as a bandpass filter, that is disposed on the surface of the at least partially transparent layer 40 that faces away from the reflecting layer 42. In the illustrated embodiment, the filter 44 therefore forms a portion of the exterior surface of the reflective panel 20 and, in conjunction with the example application of FIG. 1, would face the sink 16 and the sensor 24 such that signals emitted by the sensor may be incident thereupon as indicated by the leftwardly extending directional arrow. In an alternative embodiment, the reflective panel 20, such as the mirror, of FIG. 5B again includes an at least partially transparent layer 40 and a reflecting layer 42 positioned as a backing to the at least partially transparent layer. However, the filter 44, such as the bandpass filter, of this example embodiment is disposed between the at least partially transparent layer 40 and the reflecting layer 42. Thus, the filter 44 of this example of embodiment is sandwiched between the at least partially transparent layer 40 and the reflecting layer 42 such that signals emitted by the sensor 24 may again be incident thereupon after having passed through the at least partially transparent layer as shown by the leftwardly extending directional arrow.

The filter 44 may be formed in various manners. In an example embodiment, however, the filter 44, such as a bandpass filter, of the alternative embodiments depicted in FIGS. 5A and 5B, is formed of ink that is configured to attenuate at least signals that have the predefined wavelength. In this regard, the ink that forms the filter 44 may be applied via a silk screening process. However, the ink that forms the filter 44 may be applied in other manners, such as by ink jet printing or the like.

As noted above, the filter 44 is configured to attenuate at least signals having the predefined wavelength, but allows signals of other wavelengths, such as visible light, to pass therethrough with less attenuation than that experienced by the signals having the predefined wavelength, such as no or very little attenuation. In an embodiment to which the predefined wavelength is an IR or NIR wavelength, the filter 44 is configured to attenuate at least IR and/or NIR signals and may, for example, have attenuation characteristics, e.g., the absorbance characteristics, as graphically depicted in FIG. 6. The filter 44 of this example embodiment is configured to strongly attenuate signals having a range of wavelengths, such as by having wavelengths between 700 nanometers (nm) and 2500 nm and, in one embodiment, between 700 nm and 1000 nm and, in one more particular embodiment depicted in FIG. 6, between 830 nm and 860 nm, while minimally, if at all, attenuating, signals having wavelengths outside that range of wavelengths. As such, the sensor 24 of this example embodiment would be configured to emit signals having a wavelength within the range of wavelengths that the filter is configured to strongly attenuate, such as IR and/or NIR signals and, more particularly, signals having a wavelength of 850 nm in the example embodiment of FIG. 6.

Referring now to FIG. 7, the operations performed, such as by the system 30 of FIG. 2, in accordance with an example embodiment are depicted. The method 48 includes emitting 50 signals, at least partially attenuating 54 signals with a filter 44 (shown in FIGS. 5A and 5B), and detecting 56 a reflection of the signals, such as in order to control 58 the operation of a fixture, such as a sink 16 or a toilet 12, as will be explained in more detail below. As shown in block 50, the sensor 24 and, more particularly, the signal source 32 of the sensor is configured to emit signals having a predefined wavelength that are directed toward the reflective panel 20. As described above, the predefined wavelength of one example embodiment may include an IR or NIR wavelength. In the absence of an object being disposed between the signal source 32 and the reflective panel 20, such as in an instance as shown in FIGS. 1 and 2 in which a person is not positioned between the signal source and the reflective panel, the filter 44, such as a bandpass filter, is configured to at least partially attenuate the signals having the predefined wavelength. See blocks 52 and 54.

More specifically, in block 52, the method 48 responds differently depending upon whether or not an object 60

(shown in FIG. 8), such as a person, is disposed between the signal source 32 and the reflective panel 20. And, in block 54, when no object is disposed between the signal source 32 and the reflective panel 20 (e.g., there is an absence of the object disposed between the signal source 32 and the reflective panel 20), the filter 44 at least partially attenuates the signals having the predefined wavelength. As noted above, the filter 44 is associated with the reflective panel 20, such as by being a component of the reflective panel, and is positioned such that the signals that are emitted by the signal source 32 are also directed toward the filter.

As a result of the attenuation of signals having the predefined wavelength at block 54, signals having the predefined wavelength that are incident upon the filter 44 are not reflected back, at least not in any appreciable manner, to the sensor 24 and, as a result, are not detected by the detector 34 of the sensor. An example is depicted in FIG. 2, in which signals are incident upon the filter 44 since there is no intervening object. In this example, the filter 44 reduces or eliminates the signals that are reflected to the sensor 24, as indicated by the dashed line extending from the filter to the detector 34.

However, as shown in block 56 of FIG. 7, the sensor 24, such as the detector 34, is configured to detect the reflection of the signals having the predefined wavelength in response to the presence of the object, such as a person, between the sensor, that is, the signal source 32, and the reflective panel 20. In this regard, the signals emitted by the signal source 32 including the signals having the predefined wavelength may be reflected and scattered by the object, such as the person, with the reflected and scattered signals captured by the detector 34 without ever being incident upon the reflective panel 20 and attenuated by the filter 44. An example of this situation is shown in FIG. 8 in which an object 60 is reflecting and/or scattering the signal back to the sensor 24. By eliminating any significant reflection of signals having the predefined wavelength from the reflective panel 20 in instances in which there is no object, such as no person, standing between the sink 16 and the reflective panel as shown, for example, in FIG. 2, the detection of the reflection the signals having the predefined wavelength by the sensor 24, that is, by the detector 34, as shown, for example, in FIG. 8, provides an indication of the presence of an object, such as a person, with a much greater degree of confidence.

As shown in block 58 of FIG. 7, the system 30, such as the sensor 24 and/or a controller 38 responsive to the sensor as shown in the embodiment of FIGS. 2 and 8, is configured to control the operation of a fixture 17, such as a sink 16 or a toilet 12 in a lavatory 10 in response to detection of the reflection of signals having the predefined wavelength. For example, when it is determined (block 52) that an object 60 is not disposed between the signal source 32 and the reflective panel 20 as shown in FIG. 2, the filter 44 reduces or eliminates the signals that are reflected to the sensor 24 (block 54). Accordingly, the fixture 17 is not activated at block 58. On the other hand, when it is determined (block 52) that an object 60 is disposed between the signal source 32 and the reflective panel 20 as shown in FIG. 8, the object 60 reflects and/or scatters the signal back to the sensor 24. (block 54). Accordingly, the fixture 17 is activated at block 58.

The controller 38 may be embodied in various manners, such as by being embodied by one or more microprocessors, one or more coprocessors, one or more multi-core processors, one or more controllers, one or more computers, various other processing elements including integrated circuits or other specially configured hardware such as, for example, an ASIC (application specific integrated circuit) or FPGA (field programmable gate array), or some combination thereof for conducting one or more operations described herein. In some example embodiments, the controller 38 is configured to execute instructions stored in a memory device or otherwise accessible thereto in order to perform one or more of the functionalities described herein. The controller 38 can also include one or more components configured to communicate a signal to the fixture 17, such as the sink 16, to activate or deactivate the fixture, as described in more detail below.

By way of example, the sensor 24 of one embodiment may be positioned proximate a sink 16, such as by being positioned slightly above the sink with the reflective panel 20 and the filter 44 associated with reflective panel being positioned opposite the sink, such as on a side wall 22 opposite the sink. In this example embodiment, the sensor 24, such as the detector 34, is configured to provide an output that at least partially controls operation of the sink 16 in response to detection of the reflection of signals having the predefined wavelength. As the detection of signals having the predefined wavelength provides a reliable indication of the presence of an object 60, such as a person, between the sensor 24 and the reflective panel 20, the output provided by the sensor, such as the detector 34 of the sensor, is configured in this example embodiment to cause the sink 16 to turn on and to cause the flow of water, at least for a predefined period of time, in response to the detection of the reflection of signals having the predefined wavelength. While the output provided by the sensor 24, such as the detector 34, may directly control the operation of the sink 16, such as to turn on the flow of water in response to the detection of the reflection of signals having the predefined wavelength, the sensor of another example embodiment is configured to provide its output to a controller 38 which, in turn, is configured to interpret the output from the sensor and to control the operation of the sink, such as in the manner described above.

In an alternative implementation, the sensor 24 is positioned proximate a toilet 12 with the reflective panel 20 and the filter 44 associated with the reflective panel being positioned on a surface, such as a wall or door, opposite the toilet. In this example implementation, the sensor 24, such as the detector 34, is configured to provide an output that at least partially controls operation of the toilet 12 in response to the detection of the reflection of signals having the predefined wavelength. As described above in relation to a sink 16, as a result of having attenuated signals having the predefined wavelength that are incident upon the filter 44 associated with the reflective panel 20, the detection of reflected signals having the predefined wavelength has a much greater likelihood of being indicative of the presence of the object, such as a person proximate the toilet 12. In this example implementation, the output provided by the sensor 24 that is indicative of the presence of a person, such as in response to the detection of reflected or scattered signals having the predefined wavelength, does not cause any action to be taken by the toilet 12. However, in an instance in which the sensor 24, such as the detector 34, subsequently detects that the reflection of signals having the predefined wavelength has ceased, such as in response to the person moving away from the toilet 12, the output provided by the sensor may be configured to cause the toilet to flush. As described above, the sensor 24, such as the detector 34, may provide an output that directly controls the operation of the toilet 12 or, in other embodiments, the output of the sensor, such as the detector, may be provided to a controller 38 which, in turn, controls the operation of the toilet, such as in the manner described above.

By selectively attenuating signals having the predefined wavelength that are emitted by the sensor 24, the system 30 and method of an example embodiment allow a reflective panel 20, such as a mirror, to be positioned opposite the sensor, such as on an opposite wall 22 from a sink 16 with which the sensor is associated or on a wall or door opposite a toilet 12 with which the sensor is associated without permitting reflections from the reflective panel to cause a false indication of the presence of an object, such as a person. Thus, the system 30 and method of an example embodiment allow for the confidence in the detection of the presence of an object, such as a person, by the sensor 24 to be increased and correspondingly allows for the operations controlled by the sensor to be performed with more confidence and efficiency. While described above in conjunction with the control of a fixture 17, such as a sink 16 or a toilet 12, in a lavatory 10, a system 30 and method as well as the associated reflective panel 20, such as a mirror, of an example embodiment may be utilized in a wide variety of applications including, for example, manufacturing and inspection applications. For example, in a manufacturing or inspection application, signals of a predefined wavelength that are emitted by a sensor 24, such as a signal source 32, are utilized to detect the presence of an object, but may, in some instances, such as in an instance in which the object is not present, be reflected from a reflective surface, such as a work piece being manufactured or inspected, a support surface or the like, that may otherwise cause the presence of the object to be falsely identified in the absence of the system 30 and method of an example embodiment.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A system for detecting presence of an object, the system comprising:
    a sensor configured to emit signals having a predefined wavelength and to detect a reflection of the signals having the predefined wavelength;
    a reflective panel positioned relative to the sensor such that the signals emitted by the sensor are directed toward the reflective panel; and
    a filter associated with the reflective panel and positioned relative to the sensor such that the signals emitted by the sensor are also directed toward the filter, wherein the filter is configured to attenuate at least signals having the predefined wavelength, and wherein the filter comprises a bandpass filter that is also configured to allow visible light to pass therethrough with less attenuation than that experienced by the signals having the predefined wavelength,
    wherein the sensor is also configured to provide an output that at least partially controls operation of a fixture in response to detection of the reflection of the signals having the predefined wavelength.

2. A system according to claim 1 wherein the reflective panel comprises a mirror including an at least partially transparent layer and a reflecting layer positioned as a backing to the at least partially transparent layer, and wherein the filter is disposed on a surface of the at least partially transparent layer that faces away from the reflecting layer and toward the sensor.

3. A system according to claim 1 wherein the reflective panel comprises a mirror including an at least partially transparent layer and a reflecting layer positioned as a backing to the at least partially transparent layer, and wherein the filter is between the at least partially transparent layer and the reflecting layer.

4. A system according to claim 1 wherein the filter is disposed on only a portion of the reflective panel such that other portions of the reflective panel are free of the filter, and wherein the portion of the reflective panel on which the filter is disposed comprises the portion of the reflective panel toward which the signals emitted by the sensor are directed.

5. A system according to claim 1 wherein the predefined wavelength comprises an infrared (IR) or near infrared (NIR) wavelength such that the filter is configured to attenuate at least IR or NIR signals.

6. A system according to claim 1 wherein the filter comprises ink that is configured to attenuate at least signals having the predefined wavelength.

7. A system according to claim 1 further comprising a controller responsive to the sensor and configured to control operation of a sink in response to the sensor.

8. A system according to claim 7 wherein the sensor is positioned proximate the sink and the reflective panel and the filter associated with the reflective panel are positioned on a surface opposite the sink.

9. A system according to claim 1 further comprising a controller responsive to the sensor and configured to control operation of a toilet in response to the sensor.

10. A system according to claim 9 wherein the sensor is positioned proximate the toilet and the reflective panel and the filter associated with the reflective panel are positioned on a surface opposite the toilet.

11. A method for detecting presence of an object, the method comprising:
    emitting signals having a predefined wavelength and being directed toward a reflective panel;
    in an absence of the object being disposed between a source of the signals and the reflective panel, at least partially attenuating the signals having the predefined wavelength with a filter that is associated with the reflective panel and positioned such that the signals that are emitted are also directed toward the filter, wherein at least partially attenuating the signals comprises allowing visible light to pass through the filter with less attenuation than that experienced by the signals having the predefined wavelength;
    detecting a reflection of the signals having the predefined wavelength in response to the presence of the object between the source of the signals and the reflective panel; and
    controlling operation of a fixture in response to detection of the reflection of the signals having the predefined wavelength.

12. A method according to claim 11 wherein the reflective panel comprises a mirror including an at least partially transparent layer and a reflecting layer positioned as a backing to the at least partially transparent layer, and wherein the filter is between the at least partially transparent layer and the reflecting layer.

13. A method according to claim 12 wherein the predefined wavelength comprises an infrared (IR) or near infrared (NIR) wavelength, and wherein at least partially attenuating the signals comprise at least partially attenuating IR or NIR signals.

14. A method according to claim 12 wherein the fixture comprises a sink or a toilet.

15. A method according to claim 11 wherein the reflective panel comprises a mirror including an at least partially transparent layer and a reflecting layer positioned as a backing to the at least partially transparent layer, and wherein the filter is disposed on a surface of the at least partially transparent layer that faces away from the reflecting layer.

16. A mirror comprising:
an at least partially transparent layer;
a reflecting layer positioned as a backing to the at least partially transparent layer; and
a bandpass filter disposed so as to overlie only a portion of the reflecting layer such that signals incident upon other portions of the reflecting layer do not pass through the bandpass filter, wherein the bandpass filter is configured to attenuate at least signals having a predefined wavelength but to allow visible light to pass therethrough with less attenuation than that experienced by the signals having the predefined wavelength.

17. A mirror according to claim 16 wherein the bandpass filter is disposed on a surface of the at least partially transparent layer that faces away from the reflecting layer.

18. A mirror according to claim 16 wherein the bandpass filter is between the at least partially transparent layer and the reflecting layer.

19. A mirror according to claim 16 wherein the predefined wavelength comprises an infrared (IR) or near infrared (NIR) wavelength such that the bandpass filter is configured to attenuate at least IR or NIR signals.

20. A mirror according to claim 16 wherein the bandpass filter comprises ink that is configured to attenuate at least signals having the predefined wavelength.

\* \* \* \* \*

UNITED STATES PATENT AND TRADEMARK OFFICE
CERTIFICATE OF CORRECTION

| | | |
|---|---|---|
| PATENT NO. | : 11,391,862 B2 | Page 1 of 1 |
| APPLICATION NO. | : 16/819309 | |
| DATED | : July 19, 2022 | |
| INVENTOR(S) | : Beckman | |

It is certified that error appears in the above-identified patent and that said Letters Patent is hereby corrected as shown below:

In the Claims

Column 13,
Lines 1 and 6, "claim 12", both occurrences, should read --claim 11--.

Signed and Sealed this
Fifteenth Day of August, 2023

Katherine Kelly Vidal
*Director of the United States Patent and Trademark Office*